(12) United States Patent
Sharma et al.

(10) Patent No.: US 11,375,109 B2
(45) Date of Patent: Jun. 28, 2022

(54) MAINTAINING PEAK INTENSITY FRAMES AS PREVIEW FRAMES IN SLOW MOTION MODE OF ELECTRONIC DEVICE

(71) Applicant: SAMSUNG ELECTRONICS CO., LTD., Suwon-si (KR)

(72) Inventors: Rahul Sharma, Karnataka (IN); Yovan Sethi, Karnataka (IN); Anamika Sharma, Karnataka (IN); Amar Kumar, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 17/077,751

(22) Filed: Oct. 22, 2020

(65) Prior Publication Data

US 2021/0127058 A1   Apr. 29, 2021

(30) Foreign Application Priority Data

Oct. 25, 2019  (IN) .............................. 201941043503

(51) Int. Cl.
 *H04N 5/232* (2006.01)
 *G06V 10/75* (2022.01)
 *G06V 20/40* (2022.01)

(52) U.S. Cl.
 CPC ....... *H04N 5/23232* (2013.01); *G06V 10/751* (2022.01); *G06V 20/48* (2022.01)

(58) Field of Classification Search
 CPC .................................................. H04N 5/23232
 USPC .................................................... 348/207.99
 See application file for complete search history.

(56) References Cited

U.S. PATENT DOCUMENTS

| | | | |
|---|---|---|---|
| 8,737,832 B1 | 5/2014 | Lin et al. | |
| 2020/0077009 A1* | 3/2020 | Nakamura | ......... H04N 5/23232 |

\* cited by examiner

*Primary Examiner* — Joel W Fosselman
(74) *Attorney, Agent, or Firm* — Sughrue Mion, PLLC

(57) ABSTRACT

A method for maintaining peak intensity frames is provided. The method includes receiving a plurality of frames, each of which has an associated frame intensity, from a camera sensor; selecting a preview frame and a previous preview frame from among the plurality of frames; performing a coarse phase detection based on a frame intensity of the previous preview frame and the preview frame to identify a trend of frame intensity; monitoring a plurality of transitional preview frames after the preview frame; detecting at least one transitional frame having a frame intensity less than a previous transitional frame; and selecting a next transitional frame as a succeeding preview frame after the preview frame based on a frame intensity of the at least one transitional frame.

20 Claims, 10 Drawing Sheets

Without Flicker Mitigation Algorithm

With Flicker Mitigation Algorithm

Start of algorithm

MTP found, after which we get peak intensity frames

MAINTAINING PEAK INTENSITY FRAMES AS PREVIEW FRAMES IN SLOW MOTION MODE OF ELECTRONIC DEVICE

CROSS-REFERENCE TO RELATED APPLICATION

This application claims priority from Indian Patent Application Number 201941043503 filed on Oct. 25, 2019 in the Indian Patent Office, the disclosure of which is incorporated herein by reference in its entirety.

BACKGROUND

Field

Methods and apparatuses consistent with example embodiments relate to flicker mitigation by tracking peak intensity frames in a causal system, and more specifically to a method and system for maintaining peak intensity frames as preview frames in a slow motion mode of a camera sensor of an electronic device.

Related Art

Many commonly available light sources are powered using alternating current (AC), which fluctuates at, for example, 50 or 60 Hz (depending on the geographical region). To the naked eye or during camera capture at low capturing speed such as 30 frames per second (fps) or 60 fps, the effect of this continuously changing intensity of incident light is not clearly evident. For high speed cameras with a capture rate of 480 fps or 960 fps, the light intensity variations is very much noticeable in video preview and recording due to frames that are captured at various points of the scene brightness.

SUMMARY

One or more example embodiments provide a method for maintaining peak intensity frames as preview frames, in a slow motion mode of an electronic device.

One or more example embodiments perform a coarse phase detection.

One or more example embodiments determine a plurality of transitional preview frames.

One or more example embodiments determine a first deduction in the preview frame intensity and to determine a maximal turning point (MTP).

One or more example embodiments select a peak intensity frame after the MTP frame as the preview frame after the MTP.

One or more example embodiments determine a subsequent deduction in the preview frame intensity.

One or more example embodiments perform a fine refinement to maintain the peak intensity frame as preview frame after determining the second deduction in the preview frame intensity.

According to an example embodiment, a method for maintaining peak intensity frames as preview frames is provided. The method includes: receiving, by an electronic device, a plurality of frames, each of which has an associated frame intensity, from a camera sensor of the electronic device; selecting, by the electronic device, a preview frame and a previous preview frame from among the plurality of frames; performing, by the electronic device, a coarse phase detection based on a frame intensity of the previous preview frame and the preview frame to identify a trend of frame intensity; monitoring, by the electronic device, a plurality of transitional preview frames after the preview frame; detecting, by the electronic device, at least one transitional frame having a frame intensity less than a previous transitional frame from among the plurality of transitional preview frames; and selecting, by the electronic device, a next transitional frame as a succeeding preview frame after the preview frame based on a frame intensity of the at least one transitional frame.

According to an example embodiment, an electronic device for maintaining peak intensity frames as preview frames is provided. The electronic device includes: a memory; and a processor, coupled with the memory, configured to: receive a plurality of frames, each of which has an associated frame intensity, from a camera sensor of the electronic device; select a preview frame and a previous preview frame from among the plurality of frames; perform a coarse phase detection based on a frame intensity of the previous preview frame and the preview frame to identify a trend of frame intensity; monitor a plurality of transitional preview frames after the preview frame; detect at least one transitional frame having a frame intensity less than a previous transitional frame from among the plurality of transitional preview frames; and select a next transitional frame as a succeeding preview frame after the preview frame based on a frame intensity of the at least one transitional frame.

In an embodiment, the previous preview frame and the plurality of transitional preview frames are selected based on a frame rate of the camera sensor.

In an embodiment, the least one transitional frame includes a Maximum Turning Point (MTP) frame having a maximum peak intensity achieved by the previous transitional frame.

In an embodiment, the MTP frame indicates a first deduction in the frame intensity as compared to frame intensity of the previous transitional preview frame, wherein the first deduction is greater than a first threshold value.

In an embodiment, the peak intensity frame is selected as a next preview frame after a MTP frame by correcting a shift value for the next preview frame, where shift value is used to control a flicker effect for the next preview frame In an embodiment, the intensities of frames form a periodic waveform.

In an embodiment, the previous preview frame is a zero$^{th}$ frame in a waveform.

In an embodiment, the method further comprises maintaining, by the electronic device, the peak intensity frame as a next preview frame. Further, the method includes determining, by the electronic device, a deduction in a preview frame intensity while maintaining the peak intensity frame. Further, the method includes performing by the electronic device, a fine refinement to re-maintain the peak intensity frames as the preview frames by correcting the deduction in the preview frame intensity.

In an embodiment, performing, by the electronic device, the coarse phase detection includes performing, by the electronic device, a shift of −1 to a $n^{th}$ frame in a periodic waveform and comparing frame intensity of n−1$^{th}$ frame with the previous preview frame, wherein the n−1th frame is the preview frame, and wherein every $n^{th}$ frame has same frame intensity, deducting, by the electronic device (100), whether the intensity of the preview frame is greater than the intensity of the previous preview frame, and detecting one of: the preview frame is a rising edge frame in the periodic waveform, in response to determining that the intensity of the preview frame is less than the intensity of the previous preview frame, and the preview frame is a falling edge frame in the periodic waveform, in response to determining that the intensity of the preview frame is greater than the intensity of the previous preview frame.

In an embodiment, monitoring, by the electronic device, the plurality of transitional preview frames after the preview frame comprises performing one of: a shift of +1 to every $n^{th}$ frame after the preview frame when the preview frame is a rising edge frame and selecting the obtained frame as the transitional frame until the MTP frame is determined, and a shift of −1 to every $n^{th}$ frame after the preview frame when the preview frame is a falling edge frame and selecting the obtained frame as the transitional frame until the MTP frame is determined.

In an embodiment, selecting, by the electronic device, the next transitional frame as a succeeding preview frame comprises performing one of: a shift of −1 to a next $n^{th}$ frame after the MTP frame when the preview frame was a rising edge frame during coarse phase detection and selecting the $(n-1)^{th}$ frame after MTP as the next preview frame, and a shift of +1 to the next $n^{th}$ frame after the MTP frame when the preview frame was a falling edge frame during coarse phase detection and selecting the $(n+1)^{th}$ frame after MTP frame as the next preview frame.

In an embodiment, determining the deduction while maintaining the peak intensity frame comprises determining that the intensity of the preview frame is less than the intensity of peak intensity frame by a second threshold.

In an embodiment, performing fine refinement after determining the deduction in the peak intensity frame comprises performing one of: a shift of +1 to a next $n^{th}$ frame after the second deduction is detected, when the preview frame at which the second deduction is detected is a rising edge frame, and a shift of −1 to a next $n^{th}$ frame after the second deduction is detected when the preview frame at which the second deduction is detected is a falling edge frame.

In an embodiment, the trend of frame intensity indicates one of an increase and decrease in frame intensity.

Accordingly, the embodiments herein disclose an electronic device for maintaining peak intensity frames as preview frames in a slow motion mode of a camera sensor of the electronic device. The electronic device includes a processor coupled with the memory. The processor is configured to receive a plurality of frames with associated frame intensity from a field of view of the camera sensor of the electronic device. Further, the processor is configured to select a preview frame and a previous preview frame from the plurality of frames. Further, the processor is configured to perform a coarse phase detection based on the frame intensity of the previous preview frame and the preview frame to identify a trend of frame intensity. Further, the processor is configured to monitor a plurality of transitional preview frames after the preview frame based on the coarse phase detection. Further, the processor is configured to detect at least one transitional frame to have a frame intensity less than a previous transitional frame from the plurality of transitional preview frames. Further, the processor is configured to select a next transitional frame as a succeeding preview frame after the preview frame based on the frame intensity of the at least one transitional frame.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

The above and other aspects and features will be more clearly understood from the following detailed description, taken in conjunction with the attached drawings, in which.

DETAILED DESCRIPTION

Figure 1:
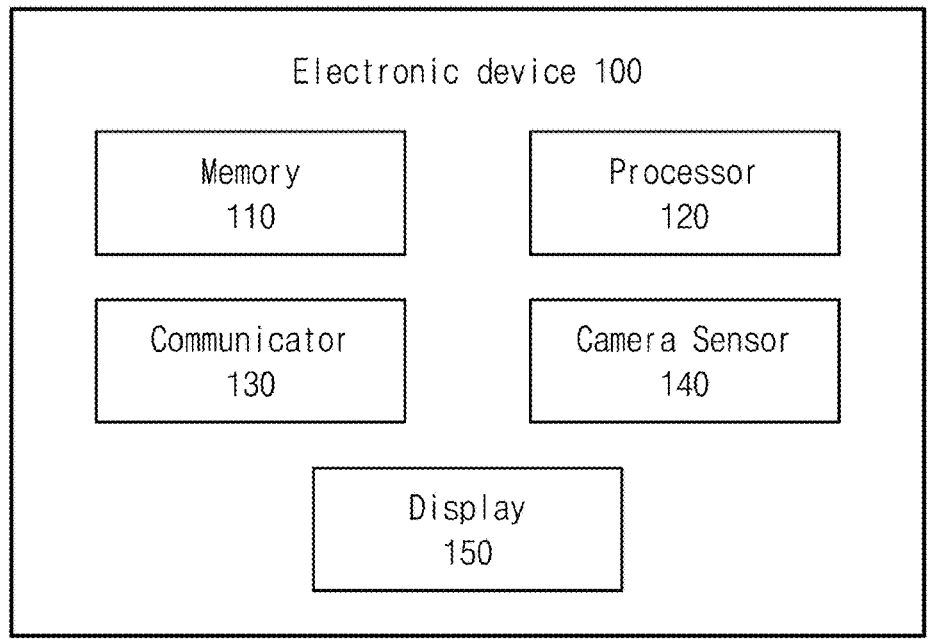
FIG. 1 is a block diagram illustrating an electronic device for maintaining peak intensity frames as preview frames in a slow motion mode of a camera sensor of an electronic device, according to an example embodiment.

Various features and advantageous details thereof are explained with reference to example embodiments that are illustrated in the accompanying drawings and detailed in the following description. Descriptions of well-known components and processing techniques are omitted so as to not unnecessarily obscure the example embodiments described herein. Also, the various example embodiments described herein are not necessarily mutually exclusive, as some example embodiments can be combined with one or more other example embodiments to form new example embodiments. The term "or" as used herein, refers to a non-exclusive or, unless otherwise indicated. The examples used herein are intended merely to facilitate an understanding of ways in which the example embodiments herein can be practiced and to further enable those skilled in the art to practice the example embodiments herein. Accordingly, the examples should not be construed as limiting the scope of the example embodiments herein.

As is traditional in the field, example embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware configured to perform some functions of the block and a processor to perform other functions of the block. Each block may be physically separated into two or more interacting and discrete blocks without departing from the scope of the disclosure. Likewise, the blocks may be physically combined into more complex blocks without departing from the scope of the disclosure.

The accompanying drawings are used to help easily understand various technical features and it should be understood that the example embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the example embodiments herein disclose a method for maintaining peak intensity frames as preview frames in a slow motion mode of a camera sensor of an electronic device. The method includes receiving, by the electronic device, a plurality of frames with associated frame intensity from a field of view of the camera sensor of the electronic device. Further, the method includes selecting, by the electronic device, a preview frame and a previous preview frame from the plurality of frames. Further, the method includes performing, by the electronic device, a coarse phase detection based on the frame intensity of the previous preview frame and the preview frame to identify a trend of frame intensity. Further, the method includes monitoring, by the electronic device, a plurality of transitional preview frames after the preview frame based on the coarse phase detection. Further, the method includes detecting, by the electronic device, at least one transitional frame to have a frame intensity less than a previous transitional frame from the plurality of transitional preview frames. Further, the method includes selecting, by the electronic device, a next transitional frame as a succeeding preview frame after the preview frame based on the frame intensity of the at least one transitional frame.

Referring now to the drawings and more particularly to FIGS. 1-10, 11A and 11B, where similar reference characters denote corresponding features consistently throughout the figures, there are shown example embodiments.

FIG. 1 is a block diagram of an electronic device 100 for maintaining peak intensity frames as preview frames in a slow motion mode of a camera sensor 140 of an electronic device 100, according to example embodiments. The electronic device 100 can be, for example, but not limited to a smart social robot, a smart watch, a cellular phone, a smart phone, a Personal Digital Assistant (PDA), a tablet computer, a laptop computer, a music player, a video player, an Internet of things (IoT) device, a smart speaker, an Artificial intelligent (AI) device or the like comprising the camera sensor 140. The electronic device 100 includes a memory 110, a processor 120, a communicator 130, the camera sensor 140 and a display 150.

The processor 120 is coupled, for example by a bus, to the camera sensor 140, the memory 110, the communicator 130 and the display 150. The processor 120 is configured to execute instructions stored in the memory 110 and to perform various other processes.

The memory 110 stores instructions to be executed by the processor 120. The memory 110 may include non-volatile storage elements. Examples of such non-volatile storage elements may include magnetic hard discs, optical discs, floppy discs, flash memories, or forms of erasable programmable read-only memories (EPROM) or electrically erasable programmable read-only memories (EEPROM). In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. In certain examples, a non-transitory storage medium may store data that can, over time, change (e.g., in Random Access Memory (RAM) or cache).

The communicator 130 is configured for communicating internally between internal hardware components and with external devices via one or more networks, and may include a transceiver (transmitter and receiver). The display 150 is configured to display an image, which may be based on the output of the camera sensor 140.

The electronic device 100 is configured to maintain the peak intensity frames as preview frames in the slow motion mode of the camera sensor 140 of the electronic device 100 for reducing flicker in the preview of the camera sensor 140.

In an example embodiment, during slow motion mode of the camera sensor 140, there are a plurality of frames in the field of view of the camera sensor 140. The frame intensity for each of the frames from the plurality of frames in slow motion mode is determined by the electronic device 100 from multiple regions of interest of the frames. The frame intensity for each of the plurality of frames in slow motion mode is plotted as a waveform against the frame number. The waveform is observed to be periodic in nature. The periodic nature of the waveform of the frame intensity with respect to the frame number indicates that the frame intensity is similar after every nth frame.

After obtaining the waveform for frame intensity of each frame from the plurality of frames in the slow motion mode, the electronic device 100 chooses the zeroth frame in the waveform as a previous preview frame. Further a preview frame is chosen and a coarse phase detection is performed on the preview frame. The coarse phase detection detects whether the preview frame is at a rising edge or a falling edge in the waveform. After performing the coarse phase detection, the electronic device 100 is configured to obtain a plurality of transitional preview frames based on a result of the coarse phase detection.

After determining the plurality of transitional preview frames, the electronic device 100 is configured to determine a maximal turning point (MTP) frame from the plurality of transitional preview frames based on intensity of the transitional preview frames. The MTP is defined as a point where, after a continuous increase in frame intensities, a sudden decrease is observed in the frame intensity as compared to a previous transitional preview frame. The sudden decrease in the frame intensity is termed as the first deduction, wherein the first deduction is greater than a first threshold value. In an example embodiment, the first threshold value is determined based on a plurality of tunable factors.

After determining the MTP frame, the electronic device 100 is configured to determine a peak intensity frame as a next preview frame after the MTP frame, by correcting the first deduction in the preview frame intensity. Thereafter the electronic device 100 maintains the peak intensity frames as the subsequent preview frames.

While maintaining the peak intensity frames as the subsequent preview frames, the electronic device 100 is configured to detect a second intensity deduction in the preview frame intensity. The electronic device 100 is further configured to perform a fine refinement to re-maintain the peak intensity frames as preview frames, by correcting the second deduction in the preview frame intensity. The second deduction indicates a drop in the frame intensity by a value greater than a second threshold.

In yet another example embodiment, the electronic device 100 is configured to further monitor the preview frames, and detect a third deduction in the peak intensity. The third deduction indicates a drop in the peak intensity by a value greater than a third threshold. The third threshold value is less than the second threshold value.

After determining the third deduction, the electronic device 100 is configured to perform a second fine refinement. If the electronic device 100, is not able to achieve the peak intensity by performing the fine refinement after the third deduction, then the electronic device 100 performs the coarse phase detection again. In an example embodiment, if peak intensity frames are obtained after performing second fine refinement, then the electronic device 100 is configured to maintain the peak intensity frames as preview frame and further detect at least one subsequent deduction in the frame intensity of the preview frames.

Thus the peak intensity is maintained by thoroughly monitoring the preview frames.

FIG. 1 shows a limited overview of the electronic device 100, but it is to be understood that example embodiments are not limited thereto. Further, the electronic device 100 may include any number of hardware or software components communicating with each other. By way of illustration, both an application running on the electronic device 100 and the device itself can be a component.

Figure 2:
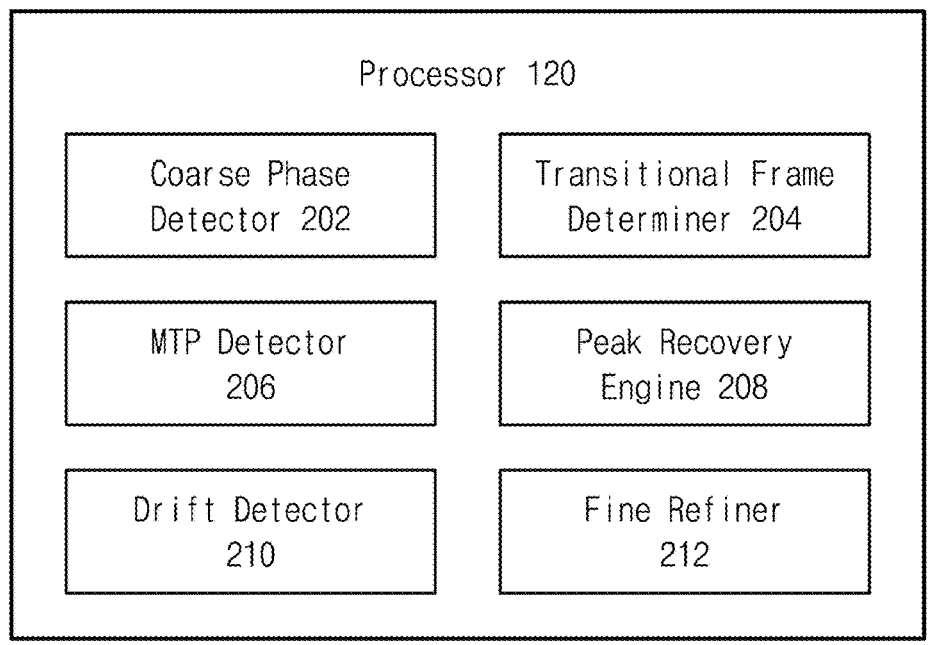
FIG. 2 is a block diagram illustrating a processor and various hardware and software components of the processor for maintaining peak intensity frames as preview frames in the slow motion mode of the camera sensor of the electronic device, according to an example embodiment.

FIG. 2 is a block diagram, illustrating the processor 120 and its components for maintaining peak intensity frames as preview frames in the slow motion mode of the camera sensor 140 of the electronic device 100, according to an example embodiment.

The processor 120 as shown in FIG. 2 comprises a coarse phase detector 202, a transitional frame determiner 204, a MTP detector 206, a peak recovery engine 208, a drift detector 210 and a fine refiner 212.

In an example embodiment, after forming the periodic waveform comprising frame intensities of the plurality of frames in the slow motion mode of the camera sensor 140, the coarse phase detector 202 is configured for performing the coarse phase detection. In an example embodiment the processor 120 choses the zeroth ($0^{th}$) frame in the waveform as the previous preview frame, then a next $n^{th}$ frame is chosen after the $0^{th}$ frame. The coarse phase detector 202, performs a shift of −1 to the $n^{th}$ frame. This $(n-1)^{th}$ frame in the waveform is chosen as the preview frame. In an example embodiment, the processor may choose any frame in the waveform as a previous preview frame and the next $(n-1)^{th}$ frame after the previous preview frame as the preview frame.

Now the coarse phase detector 202 determines the phase of the preview frame. In an example embodiment, the coarse phase detector 202 checks whether the intensity of the preview frame is less than the intensity of the previous preview frame. If the intensity of the preview frame is less than the intensity of the previous preview frame, then the coarse phase detector 202, determines that the preview frame is at a rising edge of the waveform.

In another example embodiment, if the intensity of the preview frame is greater than the intensity of the previous preview frame, then the coarse phase detector 202, determines that the second frame is at a falling edge of the waveform. Thus the coarse phase detector 202 determines the phase of the preview frame as described above.

After performing the coarse phase detection, the transitional frame determiner 204 determines the plurality of transitional preview frames. The transitional preview frames are the preview frames in between the preview frame and the MTP frame. The transitional frame determiner 204, performs a shift of +1 or −1 to the frame number of every nth frame after the preview frame and before the MTP frame based on the results of the coarse phase detection for obtaining the transitional preview frames.

In an example embodiment, the transitional frame determiner 204 performs a shift of +1 to the frame number of every nth frame after the preview frame if the preview frame is the rising edge frame. Thus, every (n+1)th frame after preview frame and before the MTP frame is chosen as the transitional preview frame. Similarly, the transitional frame determiner 204 performs a shift of −1 to the frame number of every nth frame after the preview frame if the preview frame is the falling rising edge frame. Thus, every $(n-1)^{th}$ frame after the preview frame and before the MTP frame is chosen as the transitional preview frame. Thus the plurality of transitional preview frames are obtained after the preview frame until the MTP frame is detected.

The MTP detector 206, is configured to detect the MTP frame. The MTP detector 206, continuously monitors the frame intensities of the transitional preview frames to check if at any point of time there is a decrease in the frame intensity of the transitional preview frame as compared to a previous transitional frame. This deduction in the frame intensity is termed as the first deduction. The MTP detector 206, checks whether the first deduction in the transitional preview frame intensity is greater than the first threshold value. If the difference is greater than the first threshold value, then the MTP detector 206, confirms the transitional preview frame at which there was a decrease in frame intensity greater than the first threshold as the MTP frame.

Once the MTP frame is detected, the peak recovery engine 208, corrects the first deduction and obtains a peak intensity frame as the next preview frame after the MTP frame. To obtain the next preview frame, the peak recovery engine 208, performs a shift of −1 or +1 to the frame number of the nth frame after MTP frame in the waveform.

In an example embodiment, the peak recovery engine 208 performs a shift of +1 to the frame number of a nth frame number after the MTP frame, if the preview frame is determined as the falling edge frame during coarse phase detection. The $(n+1)^{th}$ frame after MTP frame is determined as the peak intensity frame and is chosen as the preview frame. Further, every nth frame after the peak intensity frame is maintained as preview frame until the second deduction in the preview frame intensity is determined. Thus the peak recovery engine 208 maintains the peak intensity frame as the preview frames after the MTP frame.

Similarly in another example embodiment, the peak recovery engine 208 performs a shift of −1 to the frame number of the nth frame number after the MTP frame, if the preview frame is determined as the rising edge frame during coarse phase detection. The $(n-1)^{th}$ frame after MTP frame is determined as the peak intensity frame and is chosen as the preview frame. Further, every nth frame after the peak intensity frame is maintained as preview frame until the second deduction in the preview frame intensity is determined. Thus the peak recovery engine 208 maintains the peak intensity frame as the preview frames after the MTP frame.

While maintaining the peak intensity frames as preview frames, the drift detector 210, keeps monitoring the preview frames for a negative drift in the intensity of the preview frames. The drift detector 210, is configured to detect the second deduction in the frame intensity of the preview frames. The drift detector 210 constantly compares the frame intensity of a current preview frame with the peak intensity and determines whether there is the second deduction in the frame intensity, such that the second deduction in the frame intensity is greater than the second threshold value.

After determining the second deduction in the frame intensity of the preview frame, the fine refiner 212 performs a first fine refinement to obtain next preview frame. When fine refinement is done for the first time after coarse phase detection, then the fine refiner 212 performs a shift of −1 or +1 to reach back to the peak intensity. In an example embodiment, the fine refiner 212 determines whether the preview frame at which the second deduction is detected is a rising edge frame or a falling edge frame. If the peak preview frame at which the second deduction is detected is a rising edge frame, then the fine refiner 112 performs a shift of +1 to a next nth frame after the second deduction. Thus (n+1)th frame after the second deduction is again determined to be the peak intensity frame and thus the fine refiner 112 assists in maintaining the peak intensity frames as preview frames.

Similarly, if the peak intensity preview frame at which the second deduction is detected is a falling edge frame, then the fine refiner 112 performs a shift of −1 to the nth frame after the second deduction. Thus $(n-1)^{th}$ frame after the second deduction is again determined to be the peak intensity frame and the fine refiner 112 assists in maintaining the peak intensity frames as preview frames.

The drift detector 210, keeps monitoring the preview frames for a negative drift in the intensity of the preview frames after the first fine refinement. The drift detector 210, is configured to detect the third deduction in the peak intensity. The drift detector 210 detects the third deduction in the peak intensity while maintaining the preview frames after the first fine refinement. The drift detector 210 constantly compares the current preview frame intensity with the peak intensity and determines that there is a deduction in the frame intensity if the third deduction in the preview frame intensity is greater than the third threshold value.

After determining the third deduction in the preview frame intensity, the fine refiner 212 performs a second fine refinement on the preview frames. For second fine refinement the fine refiner 112 uses the same shift value as used during first fine refinement.

In an example embodiment, the fine refiner 212 performs a shift of −1 to the nth frame after the third deduction if the shift of −1 was used during first fine refinement. In another example embodiment, the fine refiner 212 performs a shift of +1 to the nth frame after the third deduction if the shift of +1 was used during first fine refinement.

In yet another example embodiment, after performing the second fine refinement the preview frame obtained does not have peak intensity then the process starts again from coarse phase detection. In another example embodiment, if after performing the second fine refinement the preview frame obtained have peak intensity value, then the fine refiner 112 maintains every nth frame after the second fine refinement as preview frame and the drift detector 110 continues monitoring the preview frame after the second fine refinement until a subsequent deduction in the preview frame intensity is determined. The entire process of fine refinement is then followed.

The FIG. 2 shows a limited overview of the processor device 120, but it is to be understood that example embodiments are not limited thereto. Further, the processor device 120, may include any number of components communicating with each other.

Figure 3:
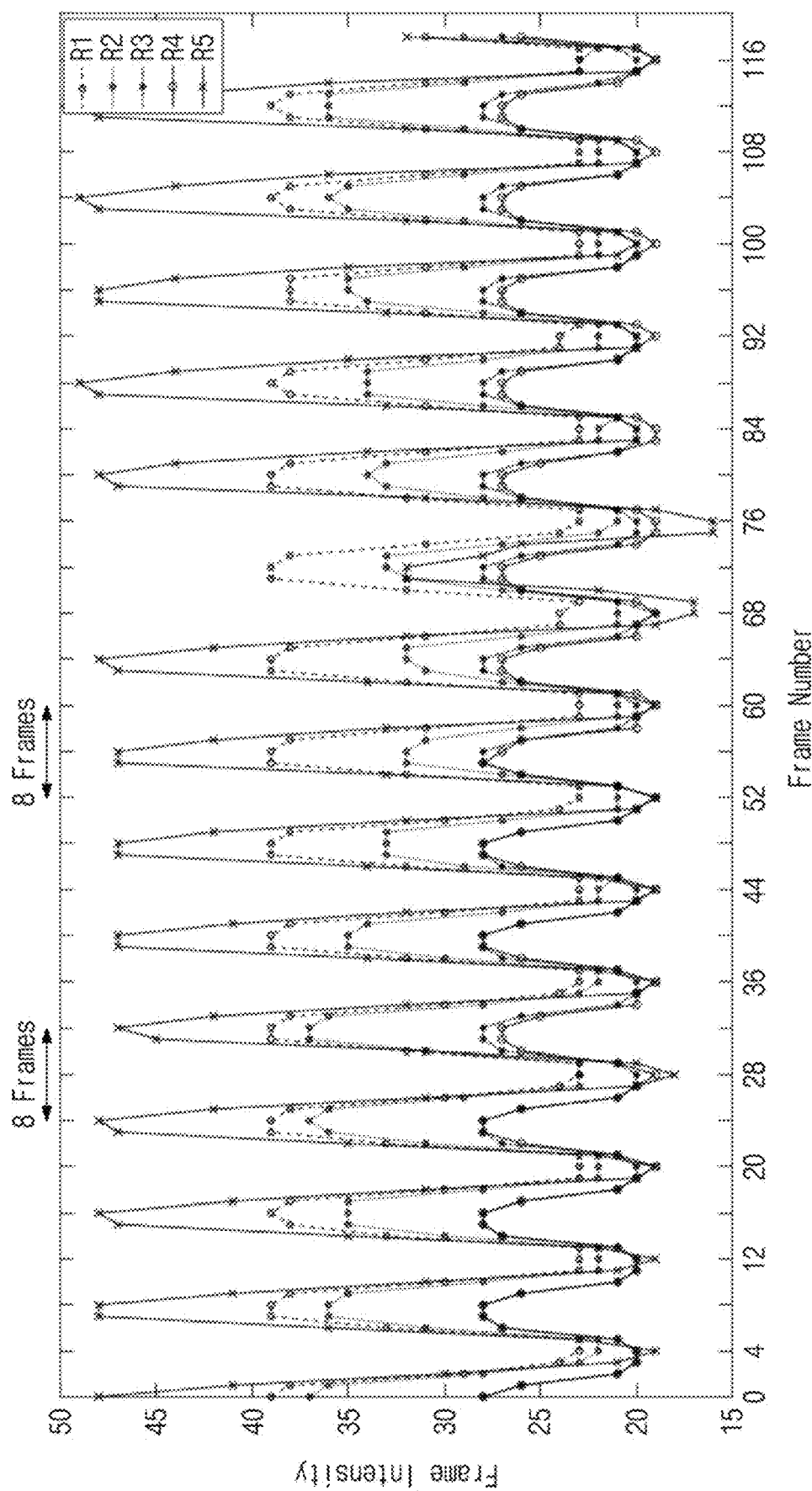
FIG. 3 is a graphical diagram, illustrating frame intensity waveforms for a plurality of regions of interest (ROI), according to an example embodiment.

FIG. 3 is a graphical diagram, illustrating frame intensity waveforms for a plurality of regions of interest (ROI), according to an example embodiment.

As seen in FIG. 3, the x-axis indicates the frame number and the Y-axis indicates the frame intensity of the plurality of frames in the slow motion mode. The different patterns indicates the different ROI for which the graph is plotted. The graph is a waveform which repeats itself after equal intervals. As seen in FIG. 3, for each region of interest, the peak intensity value is obtained at the same frame number. As seen, the first peak intensity is obtained at the $1^{st}$ frame, the next peak is obtained at the $9^{th}$ frame, followed by the $17^{th}$ frame and so on. Thus the frame intensity value is the same after every $8^{th}$ frame and the waveform repeats itself after every $8^{th}$ frame. In an example embodiment, the waveform may repeat itself after any frame number, for example the waveform may repeat itself after every $16^{th}$ frame or $32^{nd}$ frame depending upon the frequency of the camera sensor 140. The continuous curve without cross marks is positive/absolute 120 Hz sine wave, i.e., negative values are also taken as positive. The different ROI curves follow a similar waveform.

Figure 4:
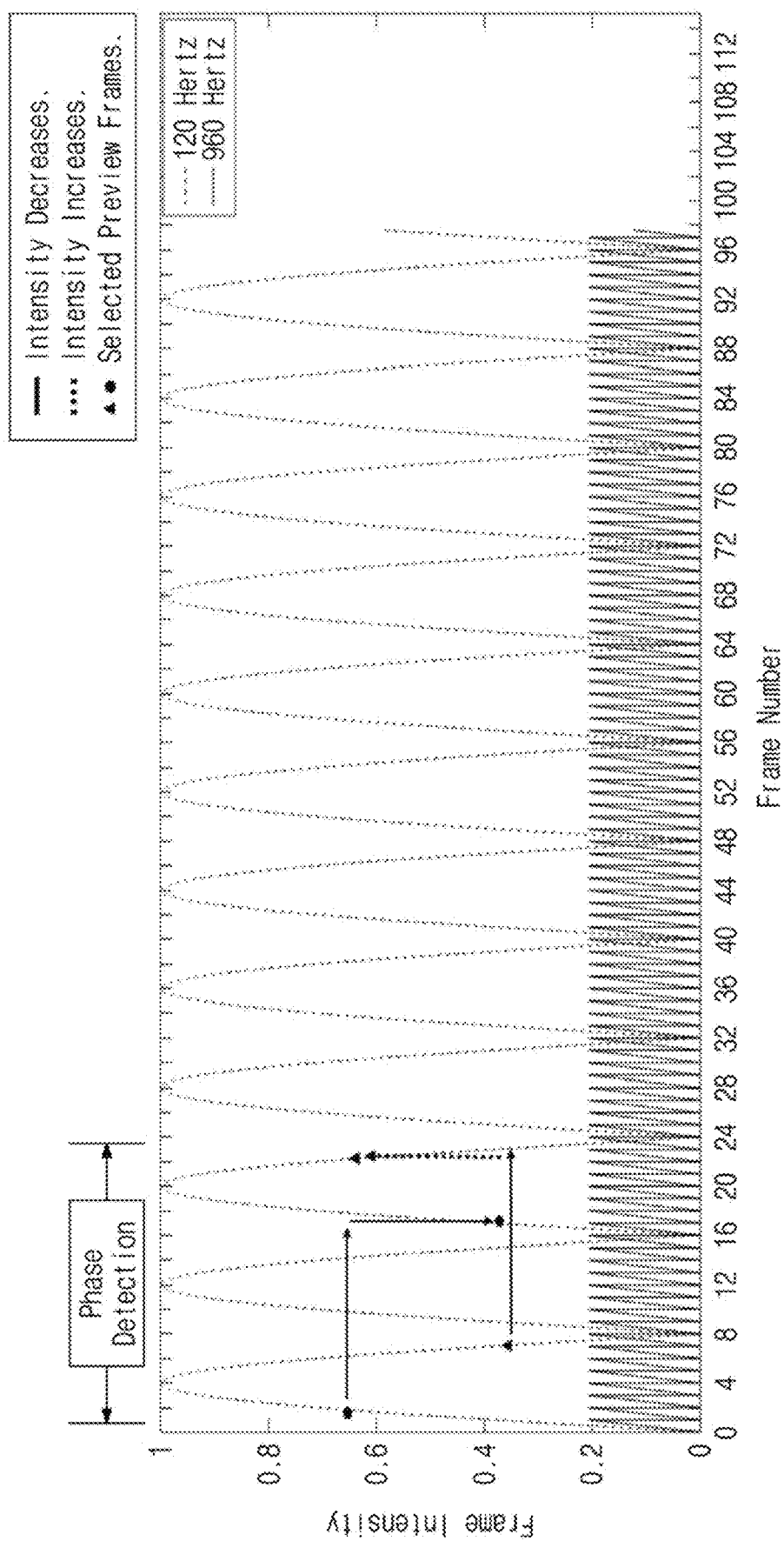
FIG. 4 is a graphical diagram, illustrating a frame intensity waveform accumulated from the plurality of ROIs and a coarse phase detection according to an example embodiment.

FIG. 4, is a graphical diagram, illustrating a frame intensity waveform accumulated from the plurality of ROIs and coarse phase detection according to an example embodiment. As seen in FIG. 4, the frame intensity is plotted as a function of the frame number for different frequencies. The frame intensity values accumulate are obtained from multiple ROIs to get a single value for a frame. These accumulated values also follow a similar waveform. In FIG. 4, the positive/absolute sine waves, shown by dash waveform and line waveform, are plotted to explain the flow of the proposed method. The dash waveform represents the accumulated intensity value. It is not an exact representation of the accumulated frame intensity value in slow motion mode, as the waveform formed using the accumulated value would not be continuous, but it is used for ease of graphical illustration/representation. The line waveform is used to show the instances/positions at which the frames will be present if captured at a 960 fps frame rate. The line waveform has a frequency of 960 Hz and the dash waveform has a frequency of 120 Hz. Considering the frame rate to be 960 fps. In this regard, 120 Hz −960/120=8. If the peak intensity frame is obtained at 0, then next peak intensity frame will be at 8. In such case, every 16th frame is chosen to get a 60 fps preview frame rate.

For example, lighting may flicker at 100 Hz. In this case, 100 Hz −960/100=9.6. If the peak intensity frame is obtained at 0, then next peak intensity frame will be at 10 and then next at 19. In such case every 19th, 10th and 19th frame in pattern is chosen to get a 60 fps preview frame rate.

Further, as seen in FIG. 4, for a 120 Hz signal, in an example embodiment, the frame intensity is calculated at frame number 2 as 0.7, as shown by black dot. In this case, frame 2 is chosen as the previous preview frame. Further, because every 16th frame is chosen to get 60 fps preview frame rate, the next frame with similar intensity is 18th frame. The 18th frame is chosen because the frame intensity corresponding to frame 2 is of the 10th frame, 18th frame and so. However, because the difference is considered to be 16, thus in this case the next similar frame is 18th. The coarse phase detector 202, performs a shift of −1 to the 18th frame and obtains the 17th frame. The 17th frame is the preview frame. The coarse phase detector 202 determines whether the 17th frame is on the rising edge or falling edge of the waveform. The frame intensity of the 17th frame and the 2nd frame is compared. If the frame intensity of the 17th frame is less than the frame intensity of the 2nd frame, then the 17th frame is considered to be at the rising edge of the waveform.

If the frame intensity of the 17th frame is more than the frame intensity of the 2nd frame, then the 2nd frame is considered to be at the falling edge of the waveform. In the current example, the frame intensity of the 17th frame is 0.4 which is less than the frame intensity of the 2nd frame and thus is on rising edge of the waveform, as shown by black dot with frame intensity 0.4 on the y-axis. Thus to obtain the transitional preview frame a shift of +1 is applied to the next 16th frame. Thus the transitional preview frame is obtained by performing 17+17. Thus the transitional preview frame is 34th frame in the waveform.

Similarly in another example embodiment, the frame intensity is calculated at frame number 7 as 0.3, as shown by triangle. In this case, the previous preview frame is chosen as the 7th frame. Further, because every 16th frame is chosen to get 60 fps preview frame rate, the next frame to have similar frame intensity is 23rd frame. However to determine the preview frame, a shift of −1 is applied to the 23rd frame. Thus the preview frame is the 22nd frame in the waveform. The frame intensity of the 22nd frame and the 7th frame is compared. If the frame intensity of the 22nd frame is less than the frame intensity of the 7th frame, then the 22nd frame is considered to be on the rising edge of the waveform. If the frame intensity of the 22nd frame is more than the frame intensity of the 7th frame, then the 22nd frame is considered to be at the falling edge of the waveform.

In the current example, the frame intensity of the 22nd frame is 0.7 which is greater than the frame intensity of the 7th frame and thus the 22nd frame is on rising edge of the waveform, as shown by triangle on the y-axis. In order to determine the transitional preview frame, a shift of −1 is applied on the next 16th frame, i.e. 7+15 is performed. Thus the transitional preview frame is the 22nd frame in the waveform.

Thus, using the above mentioned steps, the coarse phase detection of the signals is performed and the transitional frames are obtained.

Figure 5:
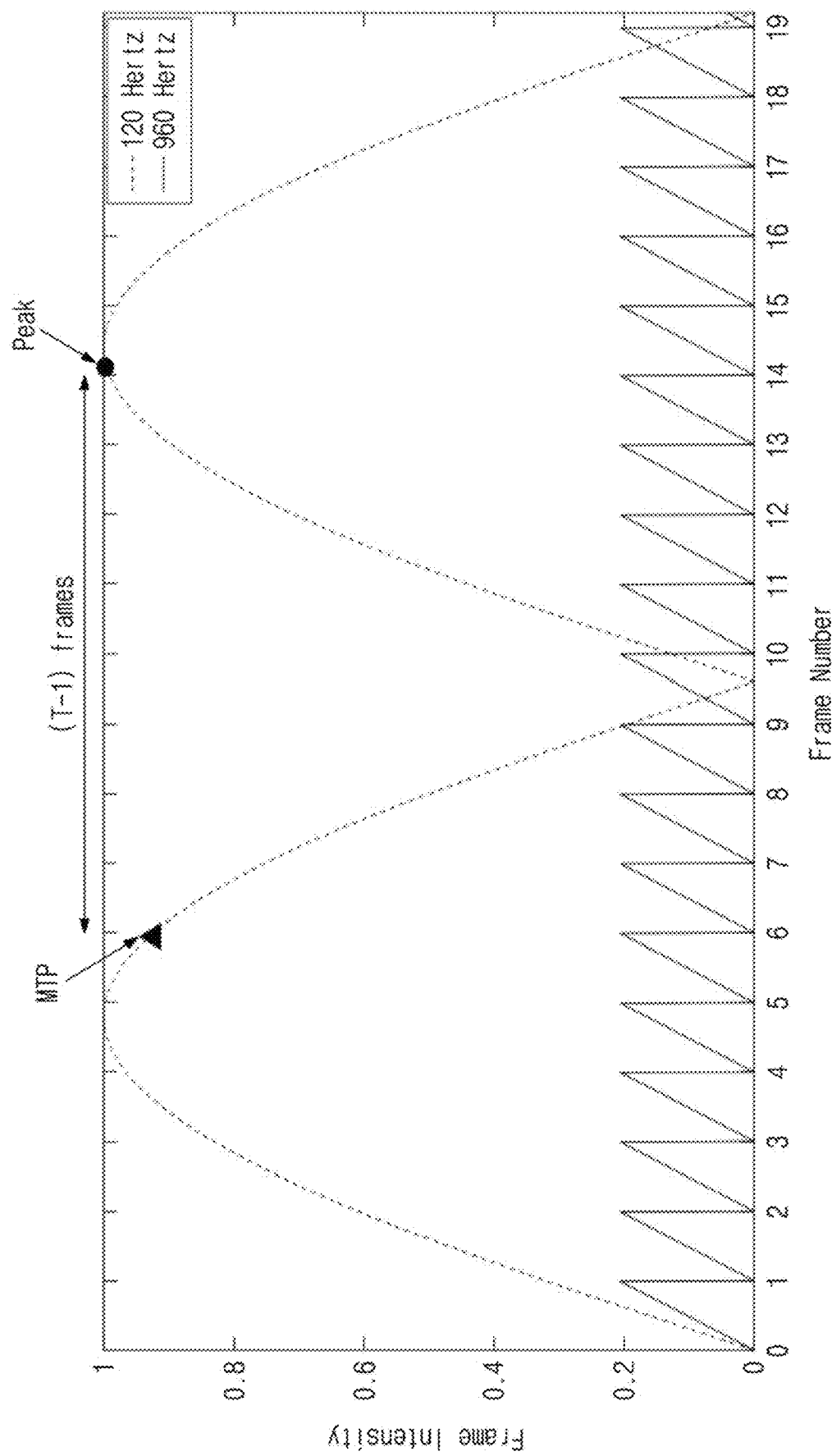
FIG. 5 is a graphical representation illustrating determination of a MTP frame, according to an example embodiment.

FIG. 5 is a graphical representation illustrating the determination of MTP frame, according to an example embodiment.

As seen in FIG. 5, the x-axis indicates the frame number and the y-axis indicates the frame intensity of the plurality of the frames in the slow motion mode. The current waveform repeats itself after every 9.6th frame rounding off to 10th frame. The MTP detector 206, monitors the intensity of the transitional preview frames constantly and it determines that there is a decrease in the transitional preview frame intensity of the transitional preview frame 6 as compared to the previous transitional preview frame. The MTP detector 206, checks whether the deduction in the frame intensity is greater than the first threshold value. If the difference is greater than the first threshold value, then the MTP detector 206, confirms the transitional preview frame at which there was a decrease in frame intensity greater than the first threshold as the MTP frame. In the current scenario, the MTP detects that the difference is greater than the first threshold value and hence marks frame 6 as the MTP frame.

Thus using the above method, the MTP frame is determined and based on the MTP frame, the next peak is obtained.

Figure 6:
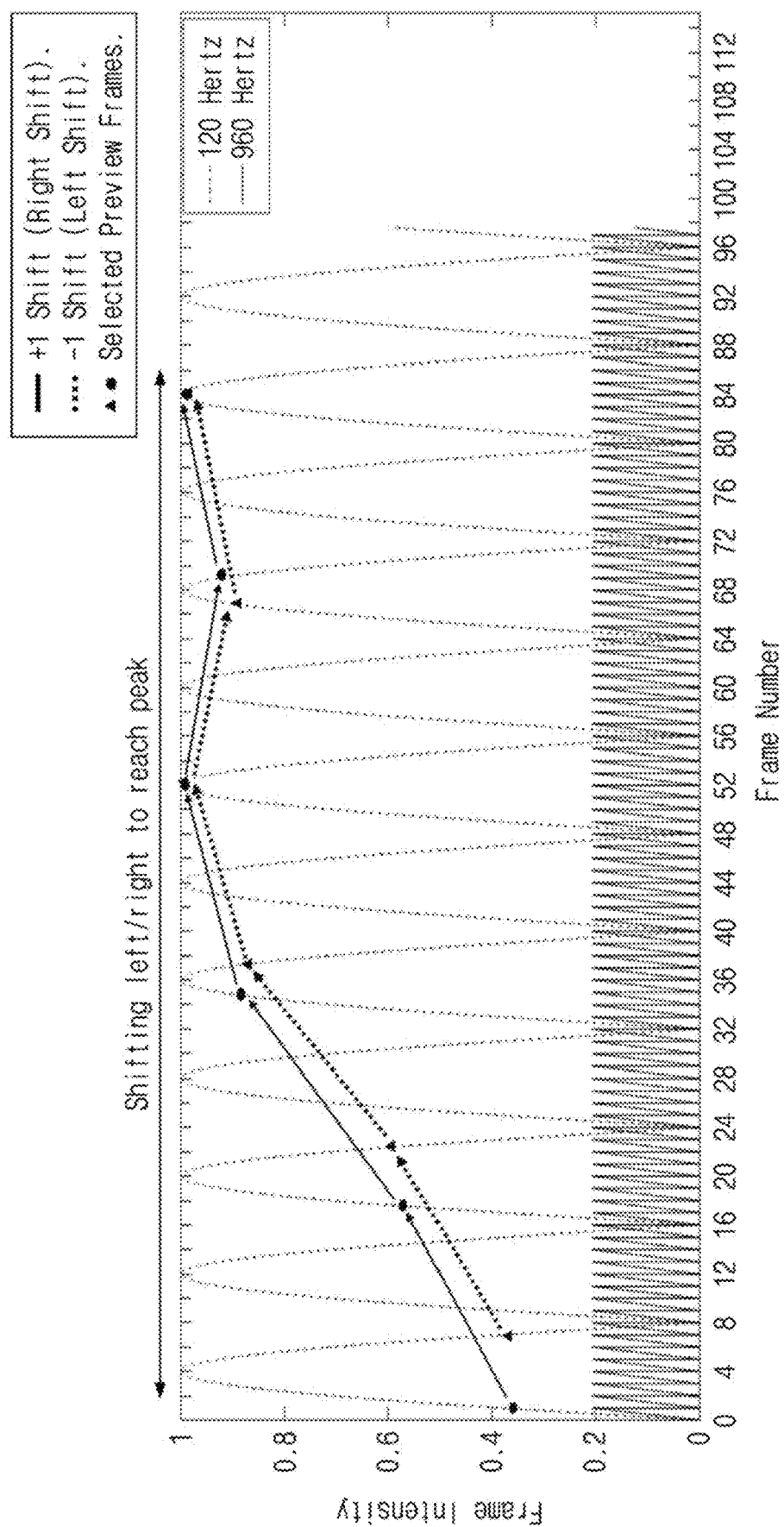
FIG. 6 is a graphical representation, illustrating determination of a plurality of transitional frames, according to an example embodiment.

FIG. 6 is a graphical representation, illustrating obtain peak intensity frame as preview frames after the MTP frame, according to an example embodiment.

As seen in FIG. 6, there are two example scenarios. A first example scenario is illustrated by the dashed line and triangles and the second example scenario is illustrated by the solid line and dots.

First example scenario: A frame numbered 7 in the waveform is chosen to be the preview frame on which coarse phase detection is already applied and the preview frame is determined to be on the falling edge. Thus a deduction of −1 is applied to the next nth frame based on a coarse phase detection previously performed for obtaining the transitional preview frames. Here the value of n is 16. Thus the transitional preview frame is the 22nd frame in the waveform. Now in order to detect the MTP frame, the MTP detector 206 compares the frame intensity of the transitional preview frame with previous transitional preview frame and continues doing so until a decrease in the frame intensity of the transitional preview frame is detected. Thus the 37th frame is obtained, the 52nd frame as the next transitional preview frames. However the next preview frame 67 has frame intensity less than the 52nd frame. Further, it is determined that the decrease in the frame intensity is more than the first threshold value and hence the frame 67 is determined as the MTP frame. Now after MTP frame (67th) a shift of +1 is performed to obtain the peak intensity frame. This peak intensity frame is chosen as the next preview frame after the MTP frame. Thus the next preview frame is 84th frame in the waveform.

Second example scenario: A frame numbered 1 in the waveform is chosen to be a preview frame on which coarse detection is already performed and the preview frame is determined to be on the rising edge. Thus a deduction of +1 is applied from the next nth frame based on a coarse phase detection previously performed for obtaining the transitional preview frames. Here the value of n is 16. Thus the transitional preview frame is the 18th frame in the waveform. Now in order to detect the MTP frame, the MTP detector 206 compares the frame intensity of the transitional preview frame with the previous transitional preview frame and continues doing so until a decrease in the frame intensity of the transitional preview frame is detected. Thus the 35th frame is obtained, the 52nd frame as the next transitional preview frames. However the next preview frame 69 has frame intensity less than the 52nd frame. Further, it is determined that the decrease in the frame intensity is more than the first threshold value and hence the frame 69 is determined as the MTP frame. Now after MTP frame (69th) a shift of −1 is performed to obtain the peak intensity frame (84). This peak intensity frame is chosen as the next preview frame after the MTP frame. Thus the next preview frame is 84th frame in the waveform.

Thus the above two example scenarios explain determination of MTP and next preview frames after the MTP.

Figure 7:
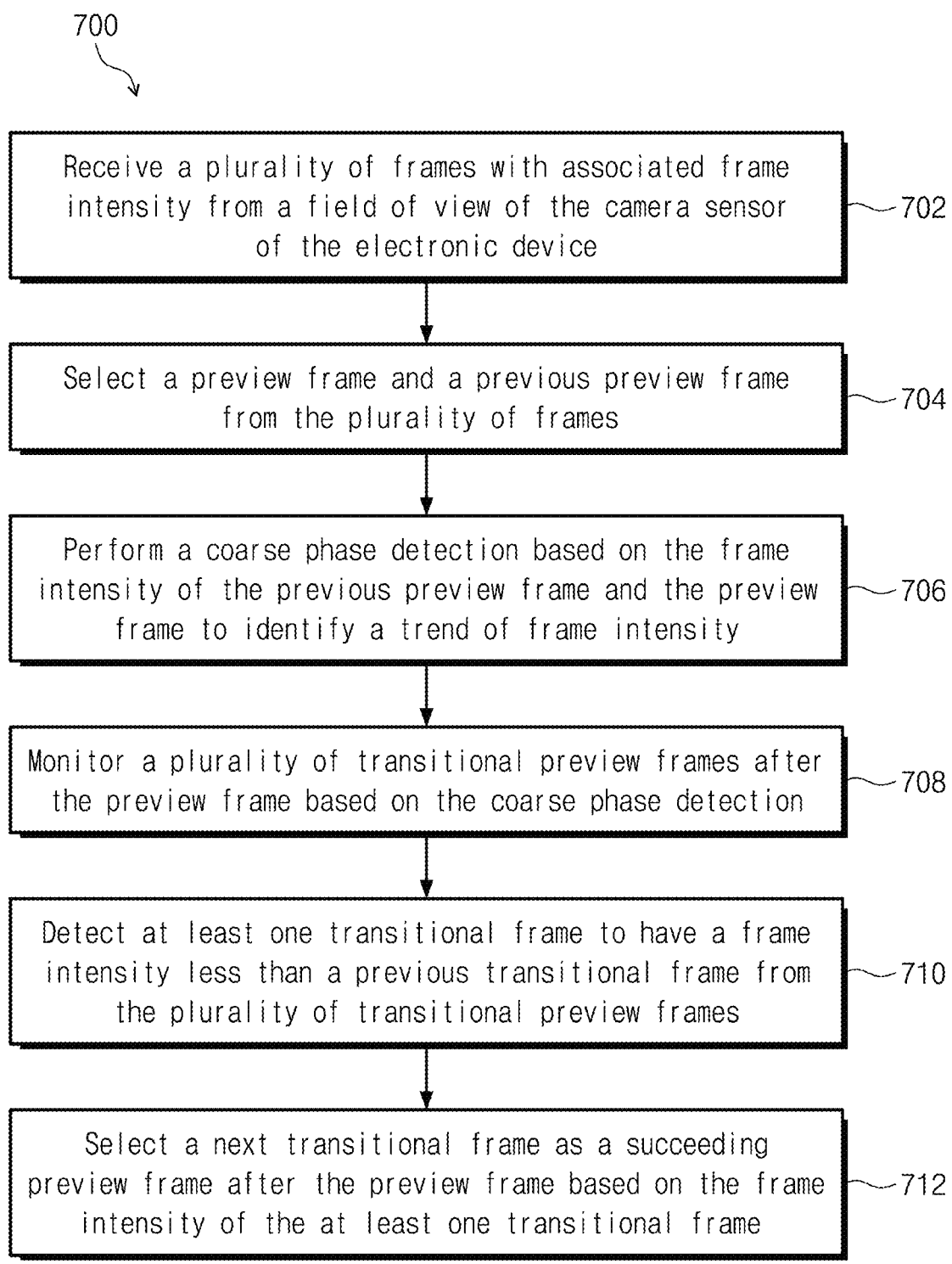
FIG. 7 is a flow diagram, illustrating a method for managing peak intensity frame as preview frames, according to an example embodiment.

FIG. 7 is a flow diagram 700 illustrating a method for managing peak intensity frame as preview frames, according to an example embodiment.

At operation 702, the plurality of frames with associated frame intensity is received from the field of view of the camera sensor 140 of the electronic device 100. In an example embodiment, the intensities of frames form a periodic waveform.

At operation 704, the preview frame and the previous preview frame are selected from the plurality of frames. In an example embodiment, the previous preview frame and the plurality of transitional preview frames are selected based on the frame rate of the camera sensor 140. The previous preview frame can be a zero$^{th}$ frame in a waveform.

At operation 706, the coarse phase detection is performed based on the frame intensity of the previous preview frame and the preview frame to identify a trend of frame intensity. In an example embodiment, the trend of frame intensity indicates one of an increase and decrease in frame intensity. In an example embodiment, the coarse phase detection is performed by performing a shift of −1 to an n$^{th}$ frame in a periodic waveform and comparing frame intensity of an n−1$^{th}$ frame with the previous preview frame, wherein the n−1$^{th}$ frame is the preview frame, and wherein every n$^{th}$ frame has same frame intensity, deducting whether the intensity of the preview frame is greater than the intensity of the previous preview frame, and detecting one of: the preview frame is a rising edge frame in the periodic waveform, in response to determining that the intensity of the preview frame is less than the intensity of the previous preview frame, and the preview frame is a falling edge frame in the periodic waveform, in response to determining that the intensity of the preview frame is greater than the intensity of the previous frame.

At operation 708, the plurality of transitional preview frames after the preview frame is monitored based on the coarse phase detection. In an example embodiment, the plurality of transitional preview frames, after the preview frame, is monitored by performing one of: a shift of +1 to every n$^{th}$ frame after the preview frame when the preview frame is a rising edge frame and selecting the obtained frame as the transitional frame until the MTP frame is determined, and a shift of −1 to every n$^{th}$ frame after the preview frame when the preview frame is a falling edge frame and selecting the obtained frame as the transitional frame until the MTP frame is determined.

At operation 710, the transitional frame having a frame intensity less than the previous transitional frame is detected from the plurality of transitional preview frames. In an example embodiment, the least one transitional frame includes the MTP frame having a maximum peak intensity achieved by the previous transitional frame. The MTP frame indicates the first deduction in the frame intensity as compared to frame intensity of the previous transitional preview frame, wherein the first deduction is greater than a first threshold value. In an example embodiment, the peak intensity frame is selected as a next preview frame after a MTP frame by correcting a shift value for the next preview frame, where shift value is used to control a flicker effect for the next preview frame.

At operation 712, the next transitional frame is selected as a succeeding preview frame after the preview frame based on the frame intensity of the at least one transitional frame. In an example embodiment, the next transitional frame is selected as a succeeding preview frame by performing one of: a shift of −1 to a next n$^{th}$ frame after the MTP frame when the preview frame was a rising edge frame during coarse phase detection and selecting the (n−1)$^{th}$ frame after MTP as the next preview frame, and a shift of +1 to the next n$^{th}$ frame after the MTP frame when the preview frame was a falling edge frame during coarse phase detection and selecting the (n+1)$^{th}$ frame after MTP frame as the next preview frame.

Figure 8:
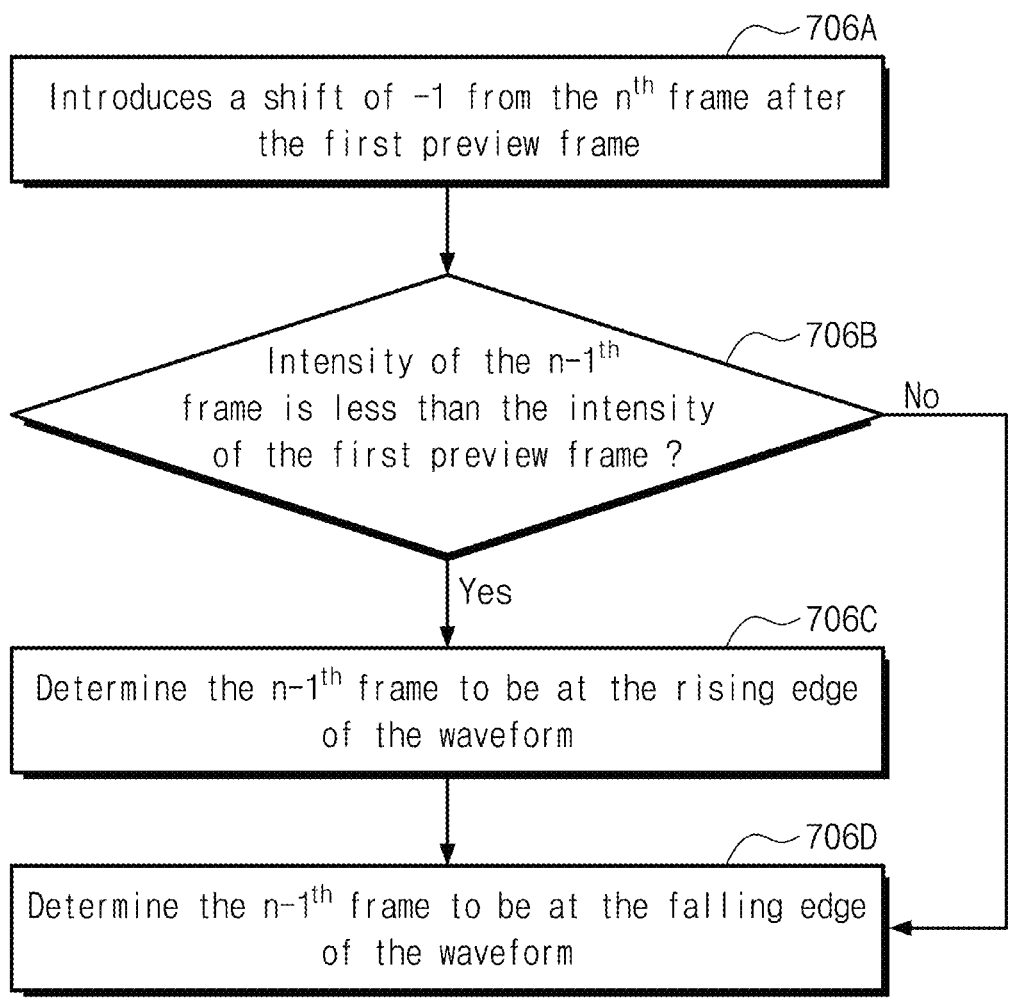
FIG. 8 is a flow diagram, illustrating a method of performing the coarse phase detection, according to an example embodiment.

FIG. 8 is a flow diagram, illustrating the method of performing coarse phase detection, according to an example embodiment.

After obtaining the waveform for frame intensity of each frame from the plurality of frames in the slow motion mode, the coarse phase detector 202 performs a coarse phase detection. At operation 706A, a shift of −1 to the nth frame after the previous preview frame is performed in the waveform. Thus the (n−1)$^{th}$ frame after the 0th frame in the waveform is the preview frame. Now coarse phase detection is performed on the preview frame. At operation 706B, after performing the shift of −1, the coarse phase detector 202, checks whether the intensity of the preview frame is less than the intensity of the first frame. If the intensity of the preview frame is less than the intensity of the first frame then the flow proceeds to operation 706C. At operation 706C the coarse phase detector 202, determines that the current frame is at the rising edge of the waveform.

If it is determined in operation 706B that the intensity of the n−1 th frame is greater than the intensity of the first frame then the flow proceeds to operation 706D. At operation 706D the coarse phase detector 202, determines that the current frame is at the falling edge of the waveform.

Figure 9:
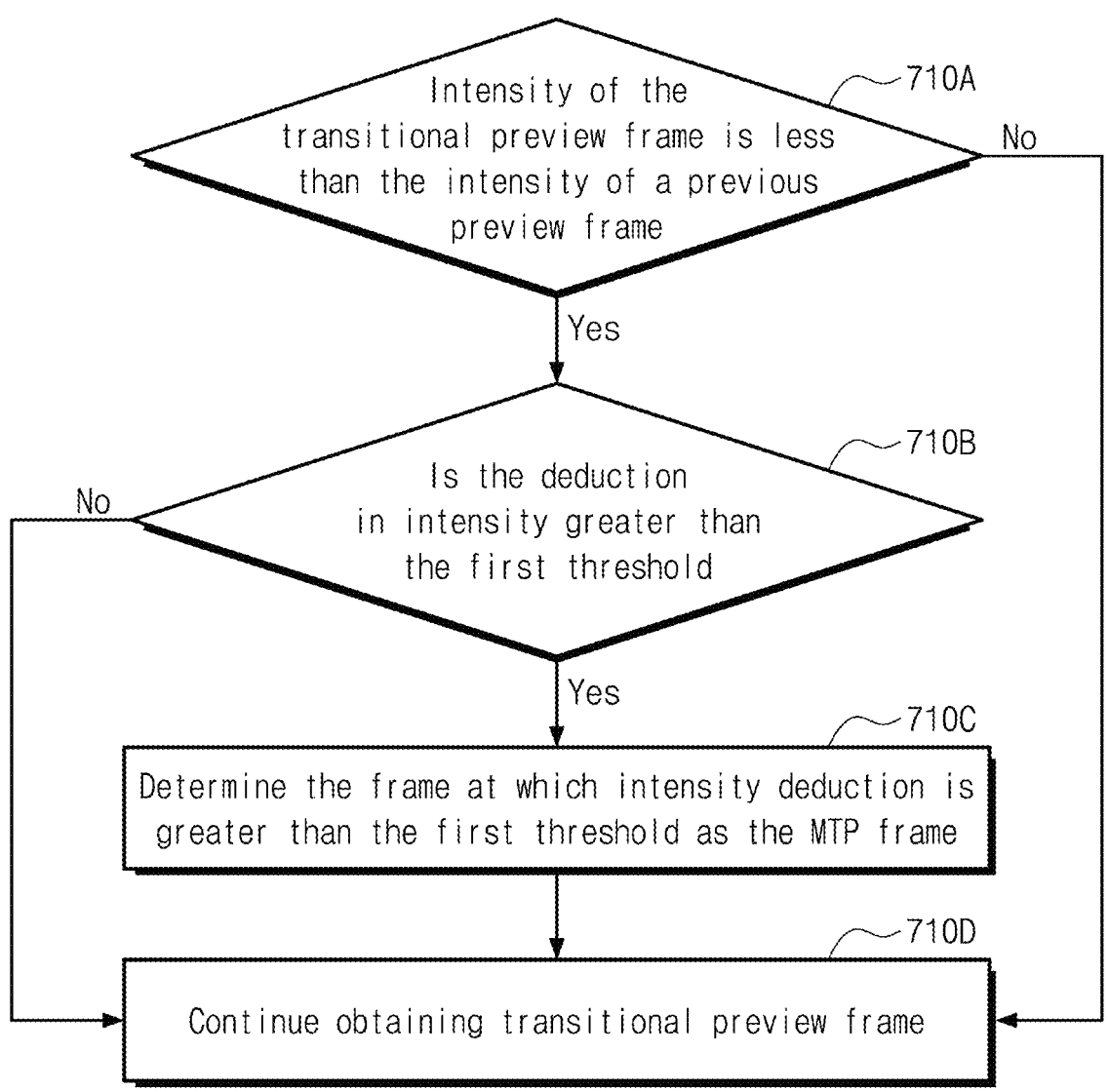
FIG. 9 is a flow diagram, illustrating determination of the MTP frame, according to an example embodiment.

FIG. 9 is a flow diagram, illustrating the determination of the MTP frame, according to an example embodiment.

After obtaining the plurality of transitional preview frames at 708, the MTP frame is determined at operation 710 by the MTP detector 206 using the steps of flow in FIG. 9. At operation 710A it is determined whether there is a decrease in the intensity of the transitional preview frames. If there is a decrease in the intensity of the transitional preview frames then the flow proceeds to operation 710B and if not then the flow proceeds to operation 710D. At operation 710B, it is determined whether the deduction in the frame intensity is greater than a first threshold value. If the difference is greater than the first threshold value, then the flow proceeds to operation 710C. At operation 710C the transitional preview frame, where the first intensity deduction is detected is confirmed as the MTP frame. Whereas if at operation 710B, it is determined that the deduction in the frame intensity is less than a first threshold value, then the flow proceeds to operation 710D. At operation 710D, the plurality of transitional preview frames are obtained.

Figure 10:
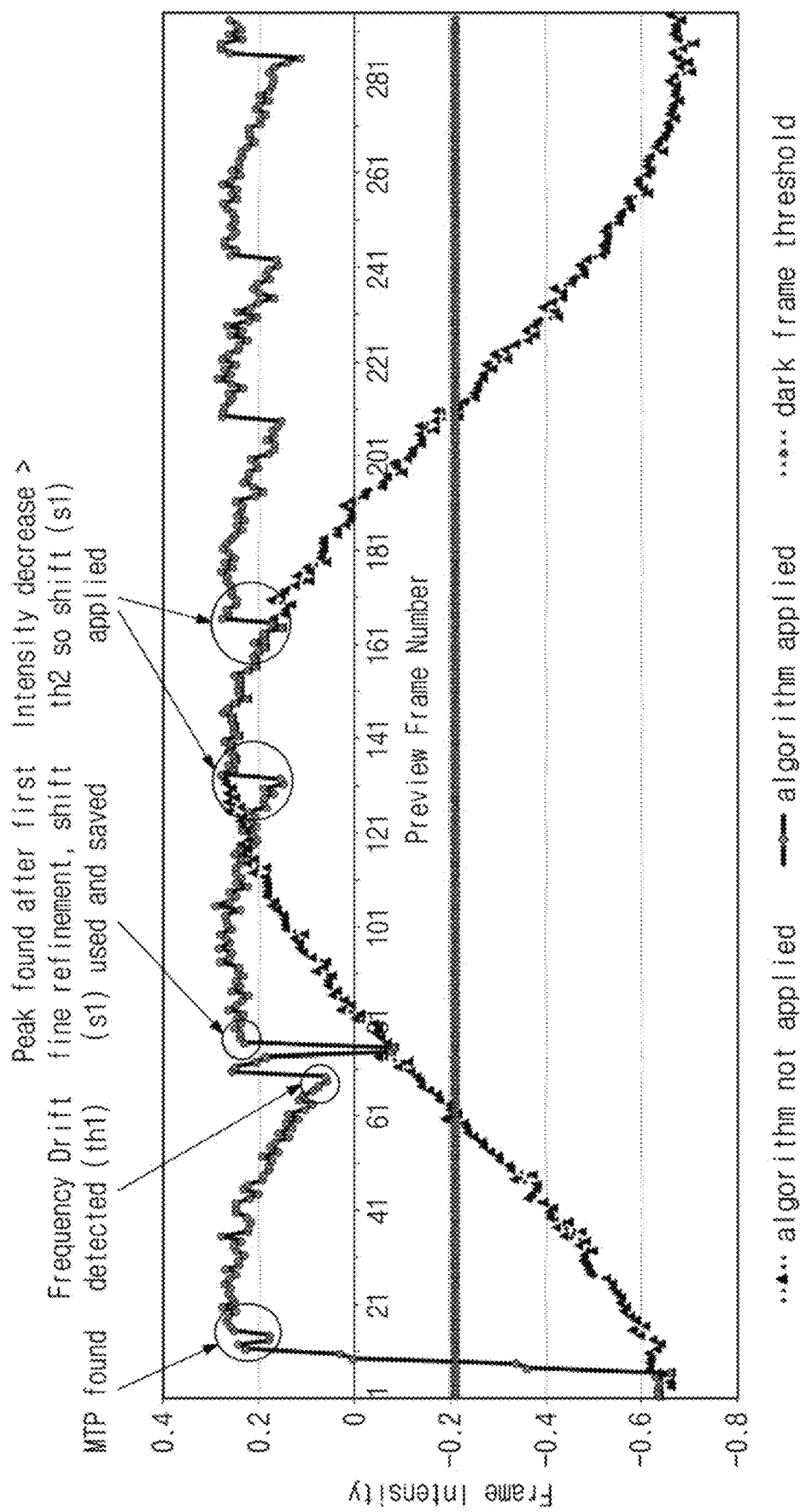
FIG. 10 is a schematic diagram, illustrating a method of maintaining peak intensity frames as preview frames, according to an example embodiment.

FIG. 10 is a schematic diagram, illustrating the method of maintaining peak intensity frames as preview frames, according to an example embodiment.

As seen in FIG. 10, the x-axis indicates the frame number for the preview frames and the y-axis indicates the frame intensity. The triangles along the bottom curve indicate the preview frame waveform for a related method. The dots along the upper curve indicate a preview frame waveform according to an example embodiment. According to example embodiments, as seen in FIG. 10, first the MTP is detected, then the peak intensity frames are obtained as the preview frames. Further, the second deduction greater than the second threshold is detected and first fine refinement is performed. Further the third deduction greater than the third threshold is detected and second fine refinement is performed using the same shift values as performed for the second threshold and thus peak intensity frame is achieved.

Further, in the method according to example embodiments, using fine refinement, peak intensity frames are selected as preview frames even if the frequency of light source has slight deviations. In FIG. 10, frequency of light source is 60.1 Hz. And as it can be seen in the diagram, the related method shows flicker effect, increase and decrease in frame intensity. On the other hand, the method according to example embodiments selects preview frames with higher frame intensities.

The advantages of using the proposed method is that only peak intensity frames are maintained as preview frames, thus mitigating the light flickering problem occurring in slow motion mode of the camera sensor 140.

Figure 11A:
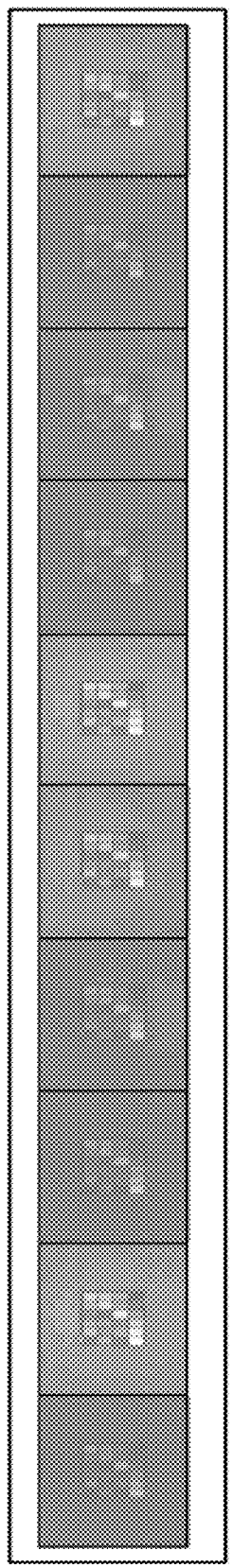
FIGS. 11A and 11B are schematic diagrams, illustrating a difference between a related method and a method according to an example embodiment.
Figure 11B:
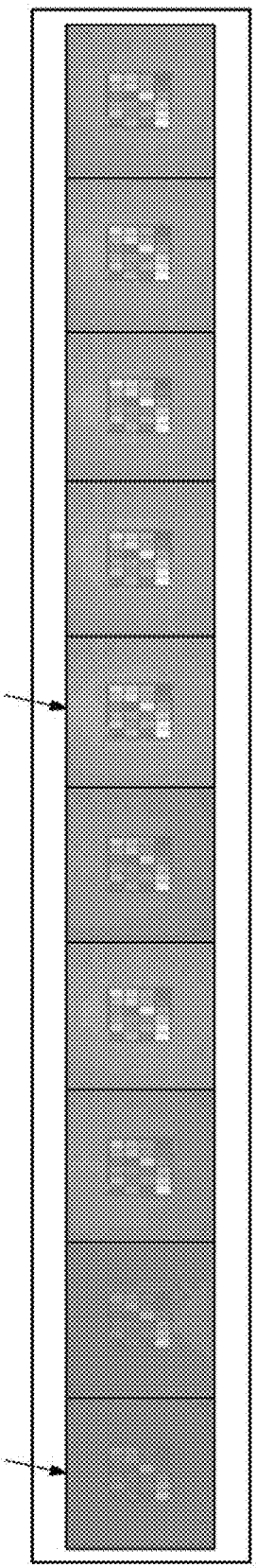

FIGS. 11A and 11B are schematic diagrams, illustrating the difference between the related method and the method according to example embodiments.

FIG. 11A illustrates the output of the camera sensor 140 on the display 150 using the related method. FIG. 11B illustrates the output of the camera sensor 140 on the display 150 using the method according to example embodiments. As seen in FIG. 11A the output is darker as compared to the output in the method according to example embodiments. Thus example embodiments maintain peak intensity frames as preview frames, reduce light flicker and provide a better output.

The example embodiments disclosed herein can be implemented using at least one software program running on at least one hardware device and performing network management functions to control the elements.

Although example embodiments have been shown and described, it will be appreciated by those skilled in the art that changes may be made to these example embodiments without departing from the principles and spirit of the disclosure, the scope of which is defined in the appended claims and their equivalents.

We claim:

1. A method for maintaining peak intensity frames as preview frames, the method comprising:
receiving, by an electronic device, a plurality of frames, each of which has an associated frame intensity, from a camera sensor of the electronic device;
selecting, by the electronic device, a preview frame and a previous preview frame from among the plurality of frames;
performing, by the electronic device, a coarse phase detection based on a frame intensity of the previous preview frame and the preview frame to identify a trend of frame intensity;
monitoring, by the electronic device, a plurality of transitional preview frames after the preview frame;
detecting, by the electronic device, at least one transitional frame having a frame intensity less than a previous transitional frame from among the plurality of transitional preview frames; and
selecting, by the electronic device, a next transitional frame as a succeeding preview frame after the preview frame based on a frame intensity of the at least one transitional frame.

2. The method as claimed in claim 1, further comprising selecting the previous preview frame and the plurality of transitional preview frames based on a frame rate of the camera sensor.

3. The method as claimed in claim 1, wherein the at least one transitional frame comprises a Maximum Turning Point (MTP) frame after the previous transitional frame having a maximum peak intensity.

4. The method as claimed in claim 3, wherein the MTP frame has a frame intensity that is at least a first threshold value lower than a frame intensity of the previous transitional frame.

5. The method as claimed in claim 1, further comprising selecting a peak intensity frame as a next preview frame after a MTP frame by correcting a shift value for the next preview frame,
wherein the shift value is used to control a flicker effect for the next preview frame.

6. The method as claimed in claim 1, wherein the associated frame intensities corresponding to the plurality of frames form a periodic waveform.

7. The method as claimed in claim 1, wherein the previous preview frame is an initial frame in a waveform.

8. The method as claimed in claim 1, wherein the method further comprises:
maintaining, by the electronic device, a peak intensity frame as a next preview frame;
determining, by the electronic device, a deduction in a preview frame intensity while maintaining the peak intensity frame; and
performing by the electronic device, a fine refinement to maintain peak intensity frames as the preview frames by correcting a shift value for the preview frame intensity.

9. The method as claimed in claim 8, wherein the determining the deduction while maintaining the peak intensity frame comprises determining that the intensity of the preview frame is less than the intensity of the peak intensity frame by at least a second threshold.

10. The method as claimed in claim 8, wherein the performing the fine refinement after determining the deduction in the peak intensity frame comprises performing one of:
a shift of +1 to a next nth frame after a second deduction is detected, based on the preview frame at which the second deduction is detected being a rising edge frame; and
a shift of −1 to a next nth frame after the second deduction is detected, based on the preview frame at which the second deduction is detected being a falling edge frame.

11. The method as claimed in claim 1, wherein the associated frame intensities corresponding to the plurality of frames form a periodic waveform, and
wherein the performing, by the electronic device, the coarse phase detection comprises:
comparing, by the electronic device, a frame intensity of an n−1th frame with the previous preview frame, wherein the n−1th frame is the preview frame, and wherein every nth frame from among the plurality of frames has a common frame intensity;

identifying, by the electronic device, whether the intensity of the preview frame is greater than the intensity of the previous preview frame; and detecting one of:
- the preview frame is a rising edge frame in the periodic waveform, based on the intensity of the preview frame being less than the intensity of the previous preview frame; and
- the preview frame is a falling edge frame in the periodic waveform, based on the intensity of the preview frame being greater than the intensity of the previous preview frame.

12. The method as claimed in claim 1, wherein the monitoring comprises performing one of:
- a shift of +1 to every nth frame after the preview frame based on the preview frame being a rising edge frame and selecting the obtained frame as a transitional frame until the MTP frame is determined; and
- a shift of −1 to every nth frame after the preview frame based on the preview frame being a falling edge frame and selecting the obtained frame as the transitional frame until the MTP frame is determined.

13. The method as claimed in claim 1, wherein the selecting the next transitional frame comprises performing one of:
- a shift of −1 to a next nth frame after the MTP frame based on the trend of frame intensity indicating the preview frame was a rising edge frame and selecting the (n−1)th frame after MTP as the next preview frame; and
- a shift of +1 to the next nth frame after the MTP frame based on the trend of frame intensity indicating the preview frame was a falling edge frame and selecting the (n+1)th frame after MTP frame as the next preview frame.

14. The method as claimed in claim 1, wherein the trend of frame intensity indicates one from among an increase in frame intensity and a decrease in frame intensity.

15. An electronic device for maintaining peak intensity frames as preview frames, the electronic device comprising:
a memory; and
a processor, coupled with the memory, configured to:
- receive a plurality of frames, each of which has an associated frame intensity, from a camera sensor of the electronic device;
- select a preview frame and a previous preview frame from among the plurality of frames;
- perform a coarse phase detection based on a frame intensity of the previous preview frame and the preview frame to identify a trend of frame intensity;
- monitor a plurality of transitional preview frames after the preview frame;
- detect at least one transitional frame having a frame intensity less than a previous transitional frame from among the plurality of transitional preview frames; and
- select a next transitional frame as a succeeding preview frame after the preview frame based on a frame intensity of the at least one transitional frame.

16. The electronic device as claimed in claim 15, wherein the processor is further configured to select the previous preview frame and the plurality of transitional preview frames based on a frame rate of the camera sensor.

17. The electronic device as claimed in claim 15, wherein the at least one transitional frame comprises a Maximum Turning Point (MTP) frame after the previous transitional frame having a maximum peak intensity.

18. The electronic device as claimed in claim 17, wherein the MTP frame has a frame intensity that is at least a first threshold value lower than a frame intensity of the previous transitional frame.

19. The electronic device as claimed in claim 15, wherein the processor is further configured to select a peak intensity frame as a next preview frame after a MTP frame by correcting a shift value for the next preview frame, and
wherein the shift value is used to control a flicker effect for the next preview frame.

20. The electronic device as claimed in claim 15, wherein the associated frame intensities corresponding to the plurality of frames form a periodic waveform.

\* \* \* \* \*